(12) United States Patent
Kainulainen et al.

(10) Patent No.: US 8,264,408 B2
(45) Date of Patent: Sep. 11, 2012

(54) USER-EXECUTABLE ANTENNA ARRAY CALIBRATION

(75) Inventors: Antti Paavo Tapani Kainulainen, Espoo (FI); Andreas Richter, Espoo (FI); Fabio Belloni, Espoo (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 12/743,594

(22) PCT Filed: Nov. 20, 2007

(86) PCT No.: PCT/IB2007/054720
§ 371 (c)(1),
(2), (4) Date: Jun. 9, 2010

(87) PCT Pub. No.: WO2009/066132
PCT Pub. Date: May 28, 2009

(65) Prior Publication Data
US 2010/0277363 A1      Nov. 4, 2010

(51) Int. Cl.
*G01S 5/02*     (2010.01)
(52) U.S. Cl. .................................................. 342/417
(58) Field of Classification Search .............. 342/417
See application file for complete search history.

(56) References Cited

U.S. PATENT DOCUMENTS

| 2004/0004573 | A1 | 1/2004 | Apostolos | |
| 2007/0010259 | A1* | 1/2007 | Hoffmann | 455/456.1 |
| 2007/0191999 | A1 | 8/2007 | Hunter et al. | |
| 2008/0254822 | A1* | 10/2008 | Tilley | 455/550.1 |

FOREIGN PATENT DOCUMENTS

| WO | WO2005121829 | 12/2005 |
| WO | WO2007096729 | 8/2007 |

OTHER PUBLICATIONS

International Search Report dated Nov. 20, 2007 for Application No. PCT/IB2007/054720.

* cited by examiner

*Primary Examiner* — Harry Liu
(74) *Attorney, Agent, or Firm* — Locke Lord LLP

(57) ABSTRACT

A system used for calibrating a direction-finding system. A device may include a signal receiver array. The signal receiver array may be utilized to determine the direction of arrival for signals emitted by other devices, and therefore, may be used to resolve the direction towards another device using the received signal. For example, an external tag may be utilized to emit a wireless signal usable inducing a response in each signal receiver of the signal receiver array. The device may also include one or more sensors usable in determining device orientation and/or a change in device orientation. The combined signal receiver response information and orientation information may be recorded at various instants as the device is moved for use in calibrating the antenna array.

21 Claims, 15 Drawing Sheets

FIG. 7
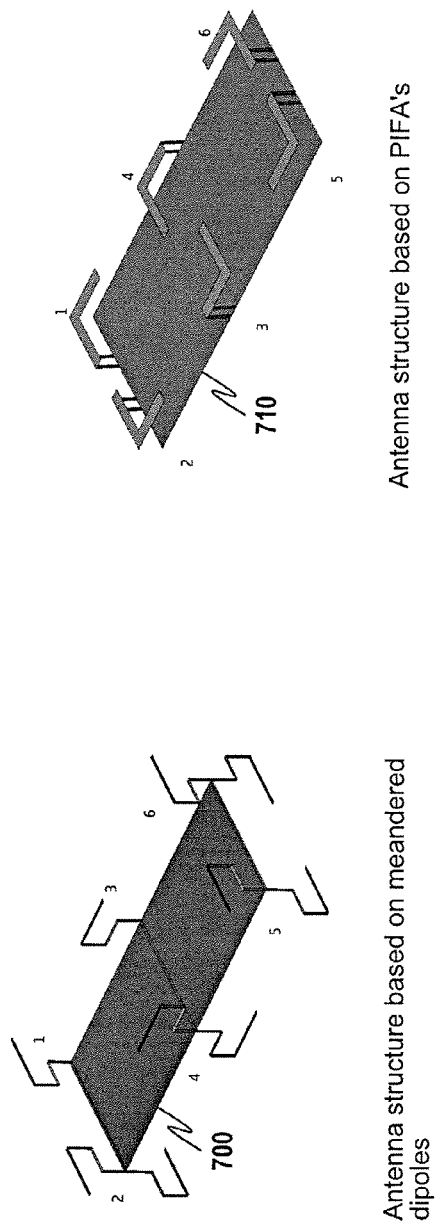
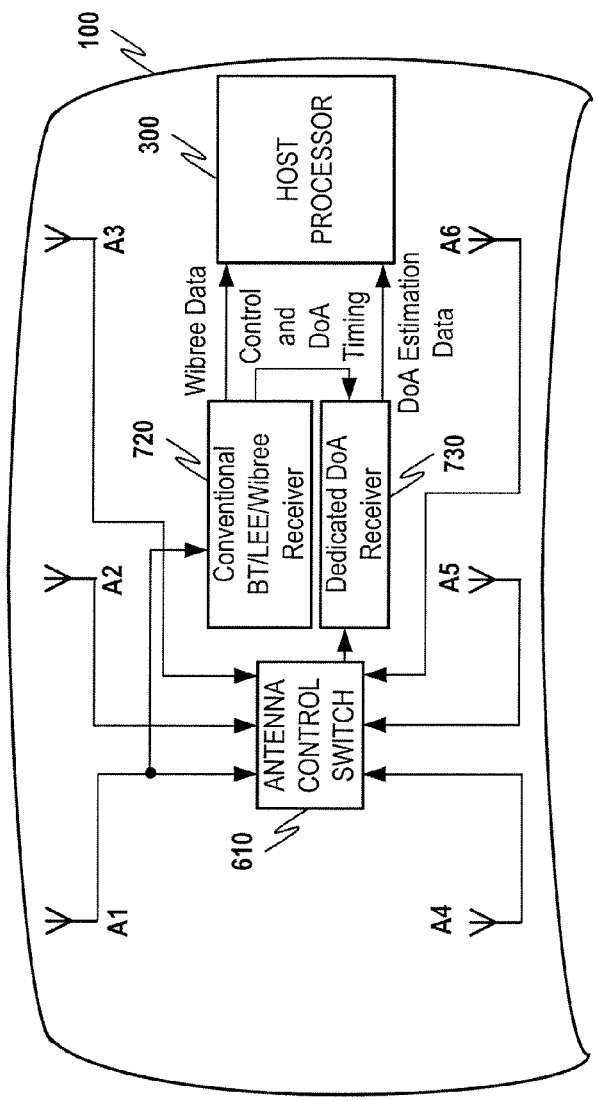

USER-EXECUTABLE ANTENNA ARRAY CALIBRATION

BACKGROUND OF INVENTION

1. Field of Invention

The present invention relates to a system for calibrating a device, and more specifically, for calibrating a direction-finding system in a device using a wireless target tag.

2. Background

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communication, to modern digital cellular telephones. GSM is an example of a widely employed 2G digital cellular network communicating in the 900 MHz/1.8 GHz bands in Europe and at 850 MHz and 1.9 GHz in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A 1 Mbps Bluetooth™ radio may transmit and receive data at a rate of 720 Kbps within a range of 10 meters, and may transmit up to 100 meters with additional power boosting. Enhanced data rate (EDR) technology also available may enable maximum asymmetric data rates of 1448 Kbps for a 2 Mbps connection and 2178 Kbps for a 3 Mbps connection. A user does not actively instigate a Bluetooth™ network. Instead, a plurality of devices within operating range of each other may automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master. These devices continually switch between various active communication and power saving modes in order to transmit data to other piconet members. In addition to Bluetooth™ other popular short-range wireless network technologies include WLAN (of which "Wi-Fi" local access points communicating in accordance with the IEEE 802.11 standard, is an example), Wireless USB (WUSB), Ultra Wideband (UWB), ZigBee (802.15.4, 802.15.4a), and UHF RFID. All of these wireless communication technologies have features and advantages that make them appropriate for various applications.

More recently, manufacturers have also begun to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

While substantial benefit may be realized in utilizing devices that include one or more of the features described above, these advantages may not be fully appreciated if the configuration required for utilizing these resources is burdensome. For example, a portable device may include some directional functionality (e.g., direction and/or position finding) that requires calibration. Antenna arrays and microphone arrays are examples of signal receiver array types usable in direction finding. These exemplary signal receiver arrays may receive signals that are processed in accordance with various algorithms to determine the direction towards the source of a target signal. In the exemplary case of a multi-antenna directional system, traditional calibration techniques would require each device to be placed in an anechoic chamber where the response to various signals may be measured using a network analyzer and an antenna positioner. Using this method, each device would have to be calibrated individually, making it prohibitive for use in a large-scale manufacturing process.

Further, even if calibration processes more suitable for manufacturing were to be devised, a device including a direction-finding system may require additional calibration post-manufacture. For example, devices may experience a variety of conditions on the way to an end consumer such as temperature extremes, impact, magnetic or electrical fields, etc. Further, even after a user begins to utilize a device, the performance characteristics of electronic components that support the directional system may change due to use, age, shock, temperature, exposure or simply due to malfunction. As a result, devices including a signal-based direction-finding system, even in normal use, may require occasionally recalibration.

SUMMARY OF INVENTION

The present invention includes at least a method, computer program, device, module and system for calibrating a direction-finding system in a device. In at least one embodiment of the present invention, the direction-finder system may be coupled to a signal receiver array. The signal receiver array may be embedded within, or coupled to, the device and may be used to determine the direction of arrival for signals emitted by another device, and therefore, may be used to resolve the direction towards the other device using a received signal. For example, an external tag may emit a wireless signal that may be received by the device via the signal receiver array. The device may also include one or more sensors usable in determining device orientation and/or a change in device orientation. A response induced in each signal receiver of the signal receiver array and orientation information provided by the one or more sensors may be stored at various instances as the device is moved in a predetermined pattern, and this data may be used in calibrating the direction-finding system.

In at least one scenario, a user may be prompted at the initiation of the calibration process to place the device in a predetermined position with respect to the tag. The device may then receive a wireless signal emitted by the tag, and use this signal to both identify the tag and to indicate at least a general direction towards the tag. A user may then be prompted to move (e.g., rotate) the device. In at least one embodiment of the present invention, the device may then proceed to record both signal data from the signal receiver array and orientation provided by the one or more sensors as the device is moved. This data may be used in formulating a matrix of calibration values usable by the direction-finding system, or alternatively, may be used to adjust a reference calibration already on the device.

In various exemplary embodiments of the present invention, a device may consider the quality of the signal when determining whether to record received information. For example, packets received that do not meet certain signal to noise ratio requirements or power level requirements may be discarded. Further, a user may be able to hold a device to be calibrated and turn in a circle in order to accumulate the data needed for calibration. The calibration process may take into account when the device is in an orientation where the user is altering the tag signal, and may adjust its behavior accordingly (e.g., the calibration may compensate for the measured signal response that may have been obscured by a user's body).

DESCRIPTION OF DRAWINGS

The invention may be further understood from the following detailed description of various exemplary embodiments, taken in conjunction with appended drawings, in which:

FIG. 7 discloses exemplary antenna arrangements and an alternative structural description for receiving a position-indicating transmission in accordance with at least one embodiment of the present invention.

DESCRIPTION OF PREFERRED EMBODIMENT

While the present invention has been described in terms of various exemplary embodiments, changes can be made therein without departing from the spirit and scope of the invention, as described in the appended claims.

I. Wireless Communication Over Different Communication Networks

Figure 1:
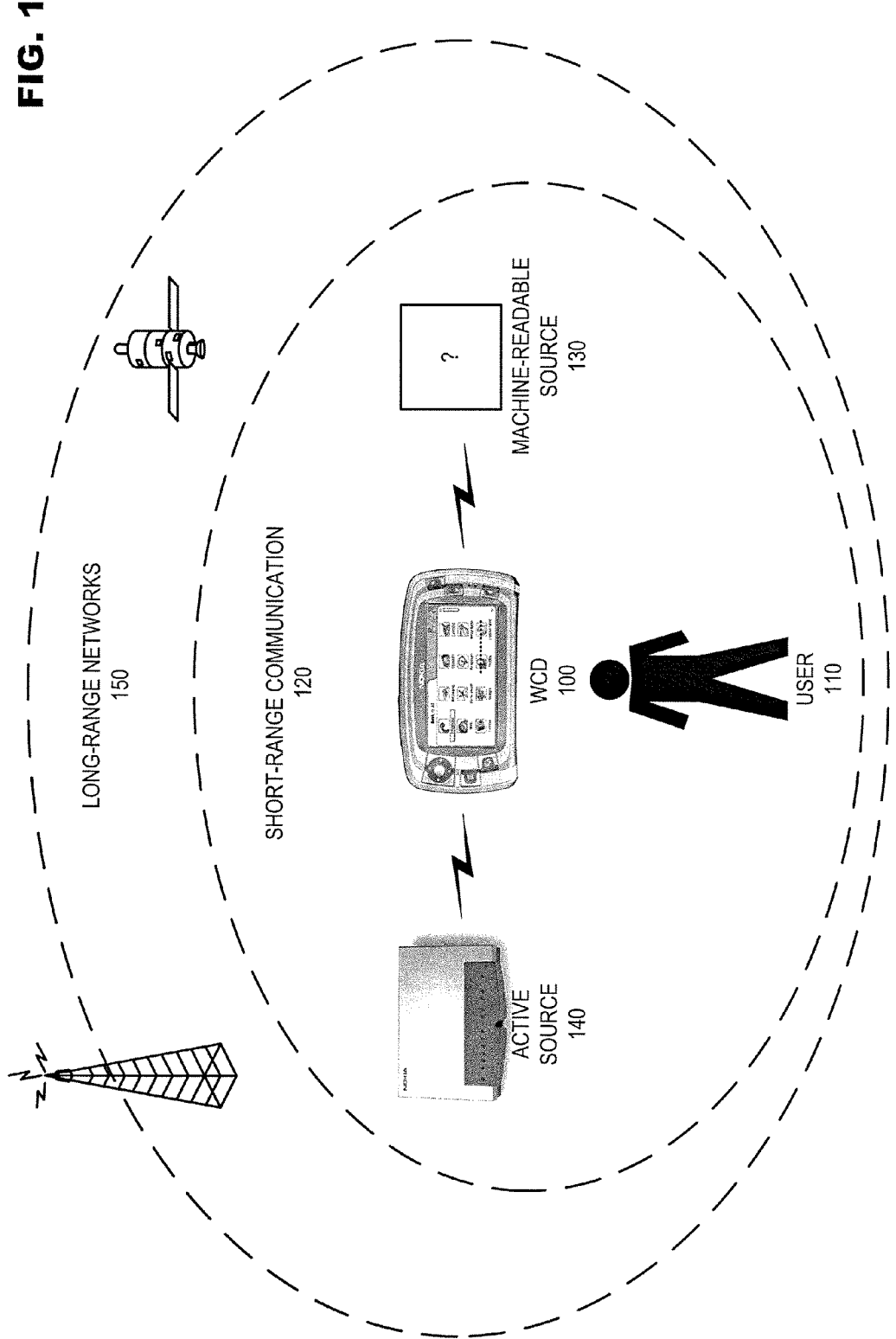
FIG. 1 discloses an exemplary short-range to long-range wireless communication environment usable to describe at least one embodiment of the present invention.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In FIG. 1, user 110 possesses an exemplary WCD 100. It is important to note that while an exemplary wireless communication device has been utilized for the sake of explanation in the following disclosure, the present invention is not limited specifically to the disclosed type of device, and may be utilized to calibrate any device including a direction-finding system that operates in a manner similar to those described herein. Examples of other devices that may be utilized to implement various embodiments of the present invention are devices that are used primarily for direction finding (such as handheld tracking devices), wireless base stations, and any other device enabled to receive and process wireless signal information in order to determine a direction towards, and/or a position of, the signal source.

This exemplary device shown in FIG. 1 may be anything from a basic cellular handset to a more complex device such as a wirelessly enabled palmtop or laptop computer. Various types of communication may be supported by WCD 100, including the depicted example classifications of short-range communication 120 and long-range networks 150. Short-range communication 120 may include a multitude of devices communicating over various wireless mediums. These devices and mediums may be selected for certain scenarios based on their characteristics, such as operational range, speed, error correction, complexity of implementation, security, etc. For example, machine-readable sources 130 may include various transponder-type interactions wherein normally only the scanning device requires its own power source. WCD 100 scans source 130 via short-range communication. A transponder in source 130 may use the energy and/or clock signal contained within the scanning signal, as in the case of RFID communication, to respond with data stored in the transponder. These types of technologies usually have an effective transmission range on the order of ten feet, and may be able to deliver stored data in amounts from a bit to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communication. For example, short-range active sources 140 may include applications wherein the sending and receiving devices are both active. An exemplary situation would include user 110 coming within effective transmission range of a Bluetooth™, WLAN, UWB, WUSB, etc. access point. In the case of Bluetooth™, a network may automatically be established to transmit information to WCD 100 possessed by user 110. This data may include information of an informative, educational or entertaining nature. The amount of information to be conveyed is unlimited, except that it must all be transferred in the time when user 110 is within effective transmission range of the access point. Due to the higher complexity of these wireless networks, additional time is also required to establish the initial connection to WCD 100, which may be increased if many devices are queued for service in the area proximate to the access point. The effective transmission range of these networks depends on the technology, and may be from some 30 ft. to over 300 ft. with additional power boosting.

Long-range networks 150 may be used to provide virtually uninterrupted communication coverage for WCD 100. Land-based radio stations or satellites may be utilized to relay various communication transactions worldwide. While these systems are extremely functional, the use of these systems is often charged on a per-minute basis to user 110, not including additional charges for data transfer (e.g., wireless Internet access). Further, the regulations covering these systems may cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
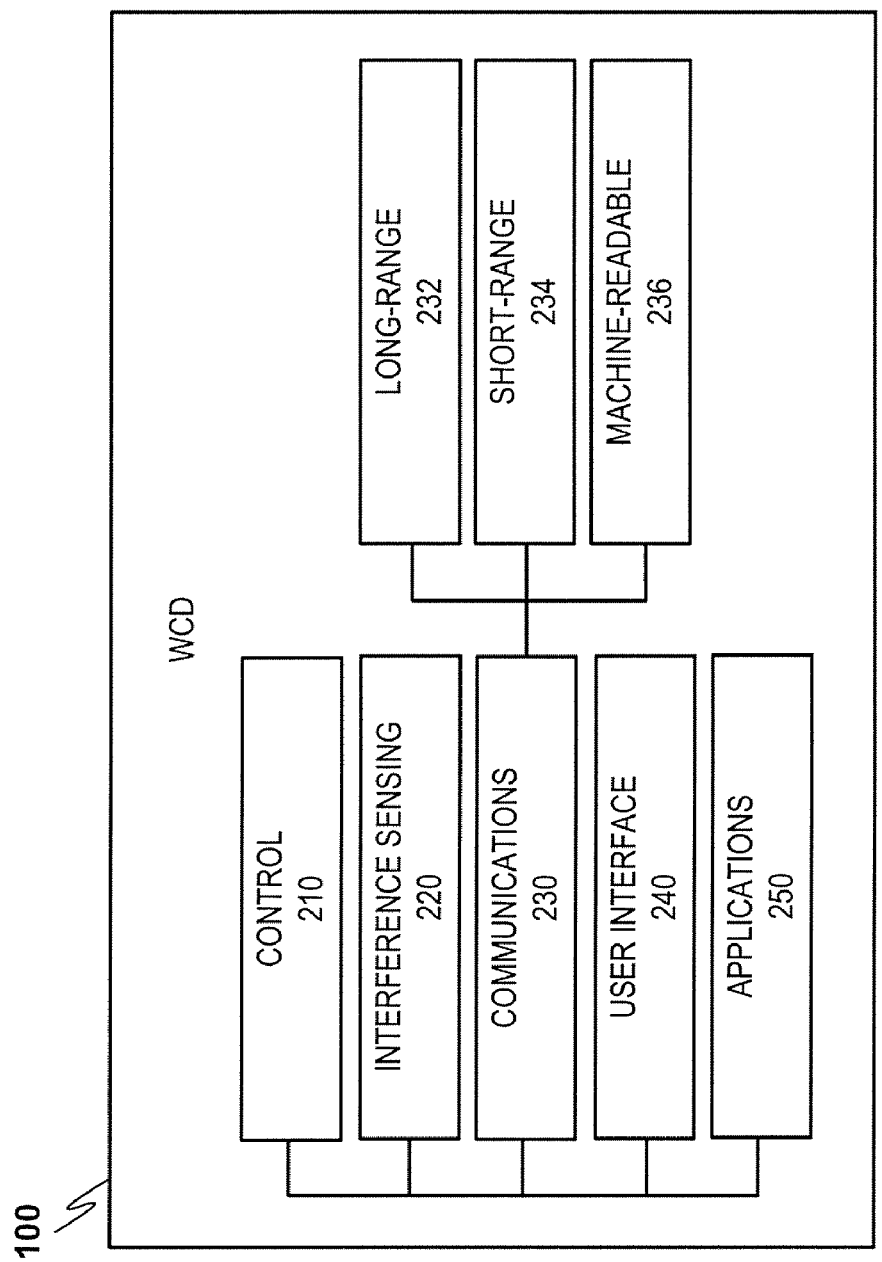
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable communications module 236. Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 may include visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 240 for presentment to the user.

Applications module 250 may incorporate all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
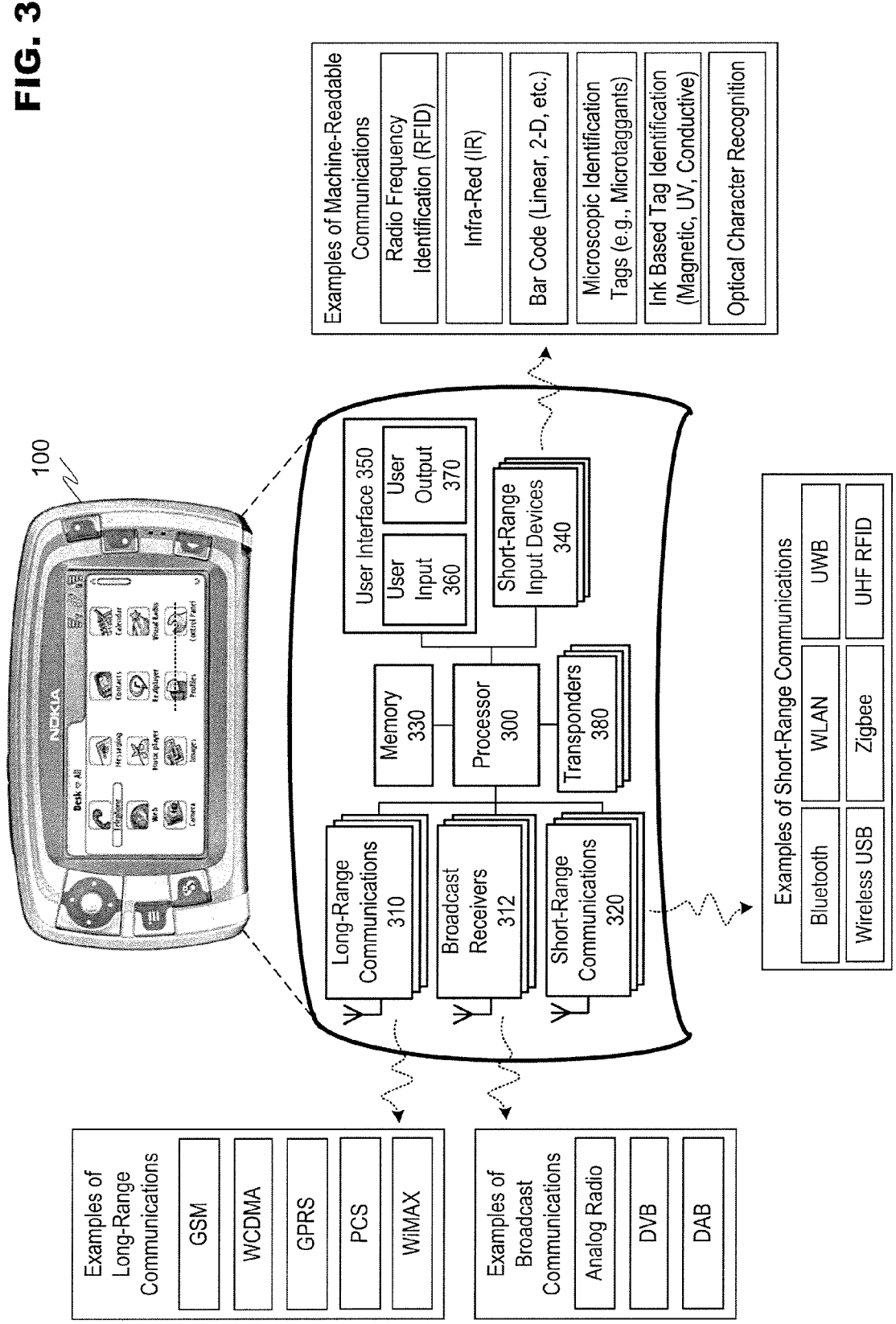
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to at least communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages. Further, the wireless media specifically-identified above are presented only for the sake of explanation in the disclosure. The present invention is not limited to the aforementioned types of wireless communication media, and may be applicable to any wireless communication medium.

As a subset of long-range communications 310, or alternatively operating as an independent module separately connected to processor 300, transmission receiver 312 allows WCD 100 to receive transmission messages via mediums such as Digital Video Broadcasts (DVB). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data. For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (e.g., including processes related to interpreting Universal Product Code labels, also known as "UPC" labels), color-encoded microscopic tags (e.g., microtaggants) that can be mixed directly into products or materials for identification and authentication uses, as well as for tracing, and optical character recognition devices for reading magnetic, UV, conductive or other types of coded data that may be provided in a tag using suitable ink. In order for short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device that may be programmed by processor 300 with information to be delivered in response to a scan from an outside source. For example, an RFID scanner mounted in an entryway may continuously emit radio frequency waves. When a person with a device containing transponder 380 walks through the door, the transponder is energized and may respond with information identifying the device, the person, etc. Alternatively, a scanner may be mounted in the WCD so that it can read information from other transponders in the vicinity (this specific interface has been omitted from the figure in order to provide a simplified drawing).

It is important to note that the scope of the functionality of an exemplary mobile device utilized in accordance with at least one embodiment of the present invention need not have all of, or could indeed add additional features to, the previously discussed components and interfaces. The mobile device previously described above is but one example of a usable device.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces (which may be wired or wireless bus interfaces). Alternatively, any and/or all of the individual components, or additional components, may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Current Systems for Providing Location-Finding or Directional Information

Figure 4:
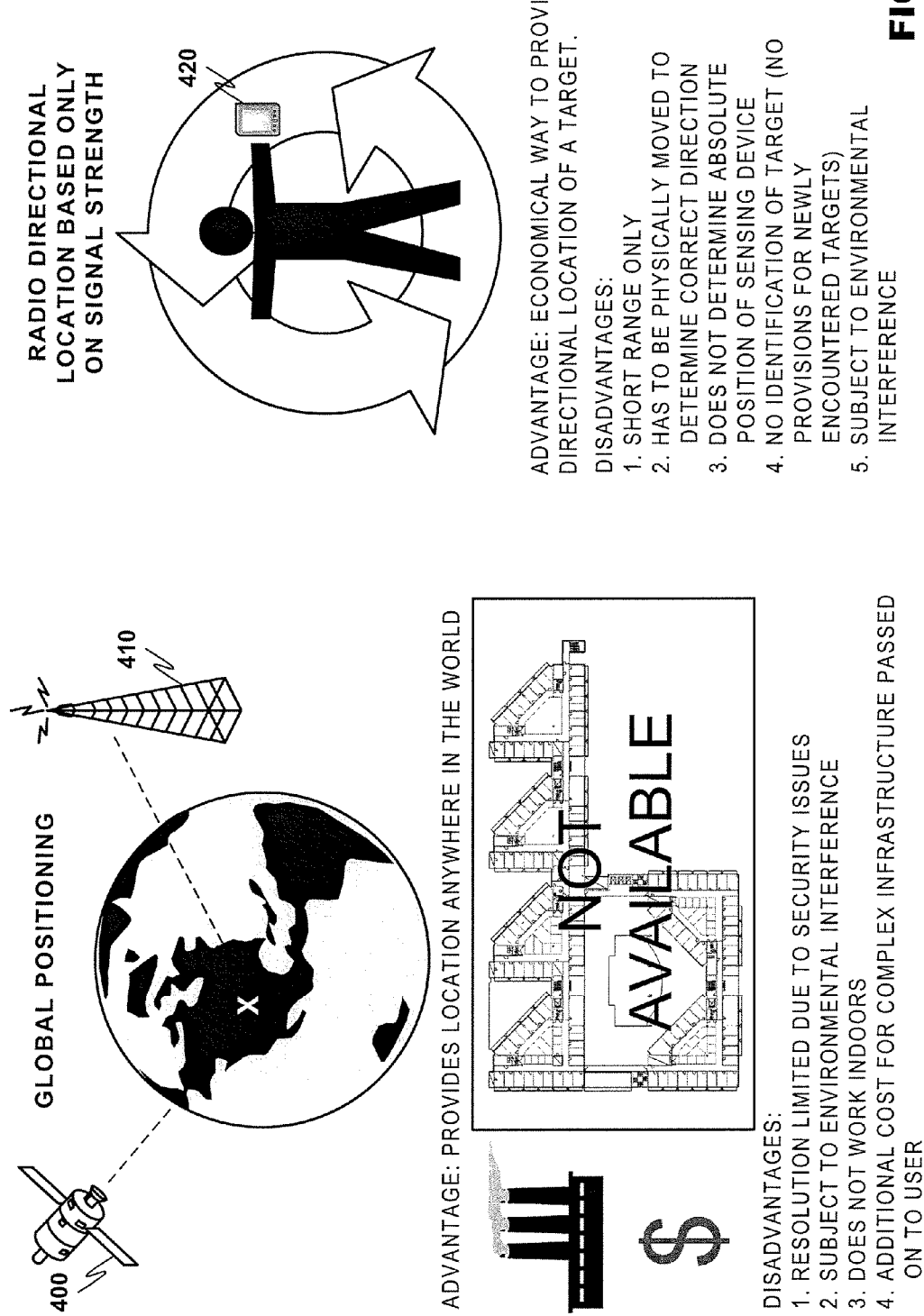
FIG. 4 discloses exemplary forms of location-finding and directional systems currently employed to determine direction and/or location.

There are some examples of location-finding or direction-finding systems on the market today. In FIG. 4, two varieties are disclosed which may represent two extremes in this technology area. These two technologies have been implemented to serve very different purposes, and as such, have different strengths and weaknesses.

Global positioning (GPS) is at least one system that may be used to deliver a precise geographic location (e.g., latitude and longitude measurement) to a user. Initially, GPS was primarily incorporated in vehicles, but now smaller compact versions are available that may be carried by a pedestrian. GPS may also be configured as an add-on to existing devices. These systems use satellites 400 or terrestrial radio networks 410 to determine the location of a receiver in global coordinates, such as longitude and latitude. The obvious advantage of these systems is their ability to determine the absolute location of a GPS device. Most commercial devices may figure the correct position of a person within a few meters.

However, while these systems deliver global location information, there are some limitations to this technology. GPS is only usable outside due to the need to receive a signal from satellite 400. Network assisted GPS (AGPS) systems also have limited indoor coverage, but the performance is typically not adequate. Precision can be intentionally limited by government regulation due to security concerns regarding how a location device may be maliciously used if too accurate. GPS positioning signals are also subject to multipath (reflection) or environmental interference, especially in dense urban environments, which tends to cause location determining errors. In order to correct this problem, differential systems may be employed combining both satellite 400 and ground based systems 410, however, these systems are more costly to operate, the additional cost of which may be passed on to the consumers. Further, the software required to implement GPS directional systems may be complex, requiring substantial hardware support in order to function properly.

On the other end of the spectrum is single antenna radio location based only on signal strength. Tracking device 420 may be tuned to the frequency of one or more known signal emitters. In the simplest implementation an omnidirectional antenna is used to find any targets in the vicinity by receiving their signals, in order to indicate their presence and possibly the location of the tracking device. To improve the accuracy, a unidirectional antenna on tracking device 420 may be used to measure the strength of each received signal, wherein the reception strength is indicated using a visual or audio method. The user physically moves the device in a sweeping pattern and monitors the signal strength indicator. The direction of strongest signal reception is deemed to be the direction towards the target. RadarGolf™ is an example of this type of device. Also more sophisticated direction and distance tracking devices exist, such as Bluespan's® Ion-Kids®, which are based on proprietary technology.

While this type of system is very economical to operate, it only has limited applications. Tracking device 420 may locate only known objects over relatively short range. The user of the device must physically sweep the device back and forth in order to determine the target direction. There is no way to determine the absolute position of the target or tracking device 420 (e.g., there is no way to estimate longitude and latitude of either tracker or target). In addition, depending on the technology, tracking device 420 is subject to electromagnetic and environmental interference, and would not be effective where this type of interference abounds, for example, in a building.

IV. A Direction of Arrival (DoA) Tracking System Utilizing a Multi-Receiver Array At least one embodiment of the present invention employs signals received on multiple signal receivers in a Direction of Arrival ("DoA") signal processing scheme in order to determine a relative direction to a target from WCD 100. In this technique, the direction of arrival of the incident signal (e.g., the position-indicating transmission) is resolved based on the phase and possibly amplitude differences of signals received by the elements of signal receiver array. In various embodiments of the present invention, a signal receiver array may be an antenna array made up of multiple antennas incorporated within, or coupled to, WCD 100. In the simplest method, historically known as the Bartlett Beamformer, the normalized received power in each array look direction (θ) is calculated using the following relationship:

$$P(\theta) = \frac{a^H(\theta) R a(\theta)}{L^2} \tag{1}$$

Wherein in equation (1), a(θ) is a so called steering vector of the array and R is the spatial covariance matrix of the received signal. L is the number of elements in the antenna array. $a^H$ denotes a conjugate transpose of the matrix a. The direction giving the highest power is then assumed to be the direction of the target.

The covariance matrix R is obtained as:

$$R = E\{x(t) x^H(t)\} \tag{2}$$

where x(t) is the vector of signals received from the antenna elements as a function of time t.

The elements of the steering vector a(θ) are the output signals of the array elements, when it receives a plane wave from direction θ. It is defined as:

$$a_n(\theta) = g_n(\theta) \cdot e^{-jk r_n \cdot u_r(\theta)} \tag{3}$$

in which $g_n(\theta)$ is the complex radiation pattern of element n, k is the wave number (defined as $2\pi/\lambda$ where λ is the wavelength at center frequency), $r_n$ is the location vector of element n, and $u_r$ is the radial vector towards the incident wave direction θ. In a simple case of a linear array of identical and equally spaced elements the steering vector simplifies to:

$$a(\theta) = g(\theta) [1\, e^{-jkd\cos\theta} \ldots e^{-j(L-1)kd\cos\theta}]^T \tag{4}$$

in which d is the inter-element spacing of linear, equally spaced antenna elements in the array. θ is the angle between the line connecting the linearly located antenna elements and the incident wave direction.

In a small handheld device the radiation patterns of the elements are typically not identical because they are affected by the metallic chassis of the device. The elements may also be differently oriented due to space limitations in the device. In this case, either Eq. (3) must be used, or the steering vector can also be directly measured in a calibration measurement, or it can be computed using electromagnetic simulation tools.

The DoA estimation accuracy decreases in the presence of multipath propagation or noise. In the noisy multipath radio propagation channel the accuracy can be increased by improving the resolution of the array through increasing its size by adding more antenna elements. In addition, the distance between any two antenna elements in the array should not exceed half a wavelength to obtain unambiguous DoA estimate.

Multipath radio propagation causes fading that can lead to rapid changes of the DoA estimates and temporary mispointings. To overcome the problem one aspect of the invention uses a tracking algorithm. It is based on keeping a register of several DoA estimates and choosing the one with highest average power to be selected as the actual output.

The DoA estimation algorithm calculates an Azimuth Power Spectrum (APS), e.g., the signal power received from azimuth directions. The tracking algorithm extracts the maxima from the azimuth power spectrum. It keeps track of e.g. the 5 strongest directions. If one of the newly extracted maxima is close (e.g. within 10 degrees) to one of these directions, then the signal power and the direction is added to the tracked direction. If not, the new direction is tracked. All the signal power values of the tracked directions are filtered using a forgetting curve and the DoA of each tracked direction is calculated using a weighted average of the extracted directions for this tracker. After each tracker update, tracked directions that are closer than e.g. 10 degrees are merged and the number of tracked directions is reduced to the five strongest directions. Without using this tracking algorithm, the strongest maximum would be chosen to be the DoA, which might lead to rapid changes in the estimated DoA due to fading.

Figure 5:
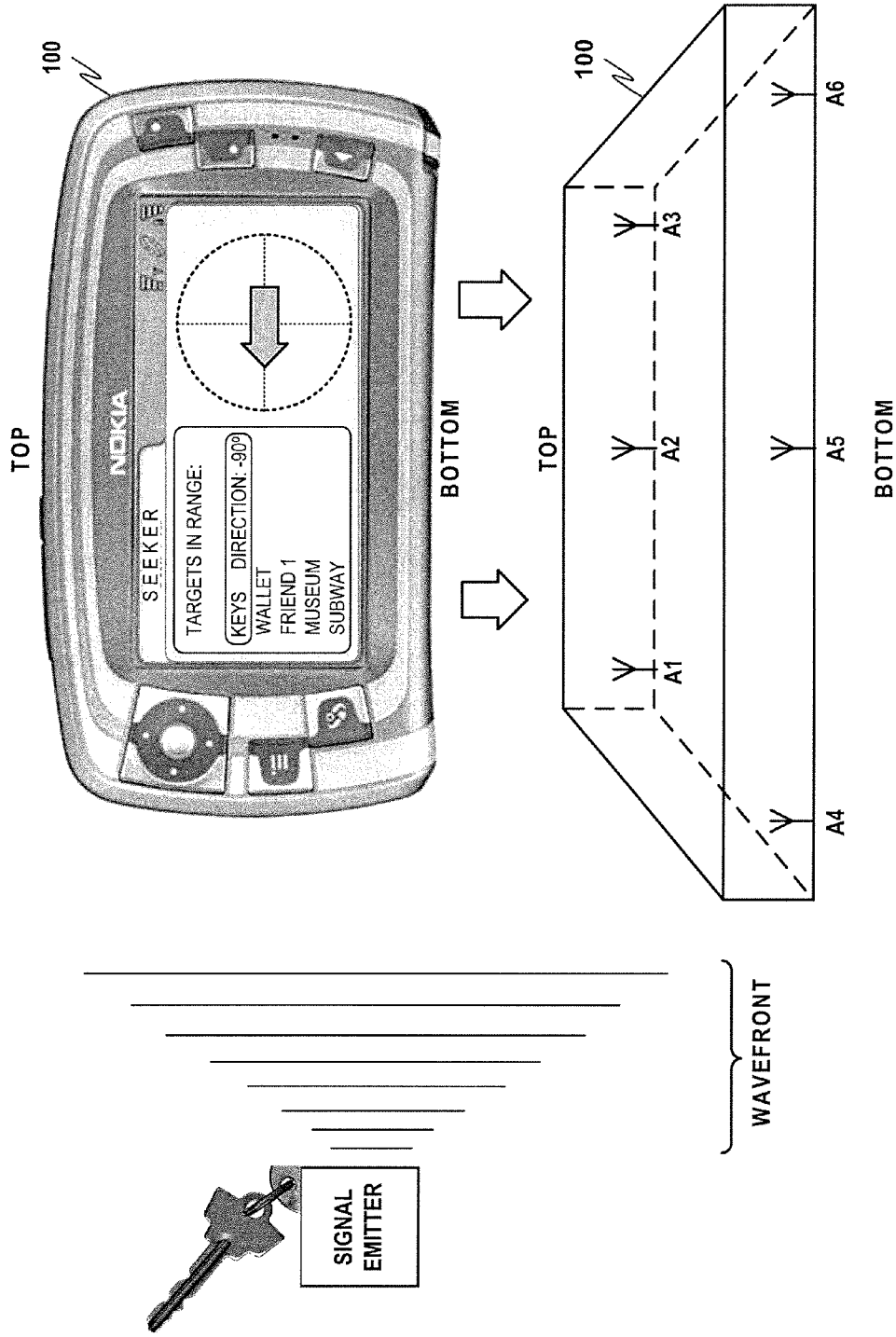
FIG. 5 discloses an exemplary wireless communication device including integrated direction-finding features in the form of an antenna array in accordance with at least one embodiment of the present invention.

FIG. 5 discloses an exemplary WCD 100 configuration usable with the present invention. In addition to the elements and features already disclosed in FIGS. 2 and 3, the present invention may also include a signal receiver array. The disclosed exemplary embodiment employs an antenna array, however, the present invention is not limited to this specific configuration, and may be implemented using different types of signal receivers.

A simplified three-dimensional transparent view of WCD 100 is shown below the exemplary exterior picture of the device 100 in FIG. 5. The transparent three-dimensional view includes at least antennas A1-A6. The number of antennas doesn't have to be six, but it can be any number larger than one. The placement of antennas A1-A6 may be within the outer housing of WCD 100 to form a signal receiver array such as the one shown. The array may provide directional field sensing that is interpreted into a direction for display on WCD 100. Signal emitter tag 500 may emit a position-indicating transmission that is receivable via the antenna array. The placement and orientation of these antennas may allow a user to hold WCD 100 in a horizontal orientation, wherein the display faces upward towards the sky. As will be seen, this orientation lends more naturally to a pointer display provided by direction-finder system for indicating direction, such as in the use of a traditional magnetic compass.

In another example (not shown) the antenna array and/or support circuitry may be housed within an outside component that may be removably attached to WCD 100. This exterior component or attachment may be connected when user 110 wants to determine direction or location, and its connection may automatically signal WCD 100 to enter a position or direction finding mode. It is important to note that if the antenna array is housed in an attachable exterior unit, that the orientation of the exterior unit with respect to WCD 100 would be a fixed, predetermined orientation with respect to the housing of WCD 100 in order to establish a known orientation for the antenna array. In this way, the antenna array will always be in the same (or a known) configuration when attached to WCD 100.

FIG. 5 also includes an example display shown on WCD 100 that is viewable by user 110. This display may be implemented in different configurations depending upon the application to which it is applied, and in accordance with at least one embodiment of the present invention may be provided by a direction-finder system within WCD 100. In this example, the display shows both a list of possible target objects and an arrow pointer. There can be one or multiple active signal emitters 500 within one area at the same time. Multiple beacons can share the same communications medium by using a multiple access method (code, frequency or time). The "KEYS" target object is currently selected. This object is also represented in FIG. 5 as by signal emitter 500, which may be included as a keychain connected to a set of keys. Since the keys object is selected, the WCD 100 will attempt to define the relative direction towards the target designated as keys. The display shows the directional arrow pointing in the direction of the keys, and gives a relative direction measurement towards the keys of −90°. As the user moves toward the selected target, WCD 100 will continuously measure the signal of the target device and will update the display accordingly so that the arrow and the directional measurement continue to indicate the relative direction toward the keys.

Figure 6:
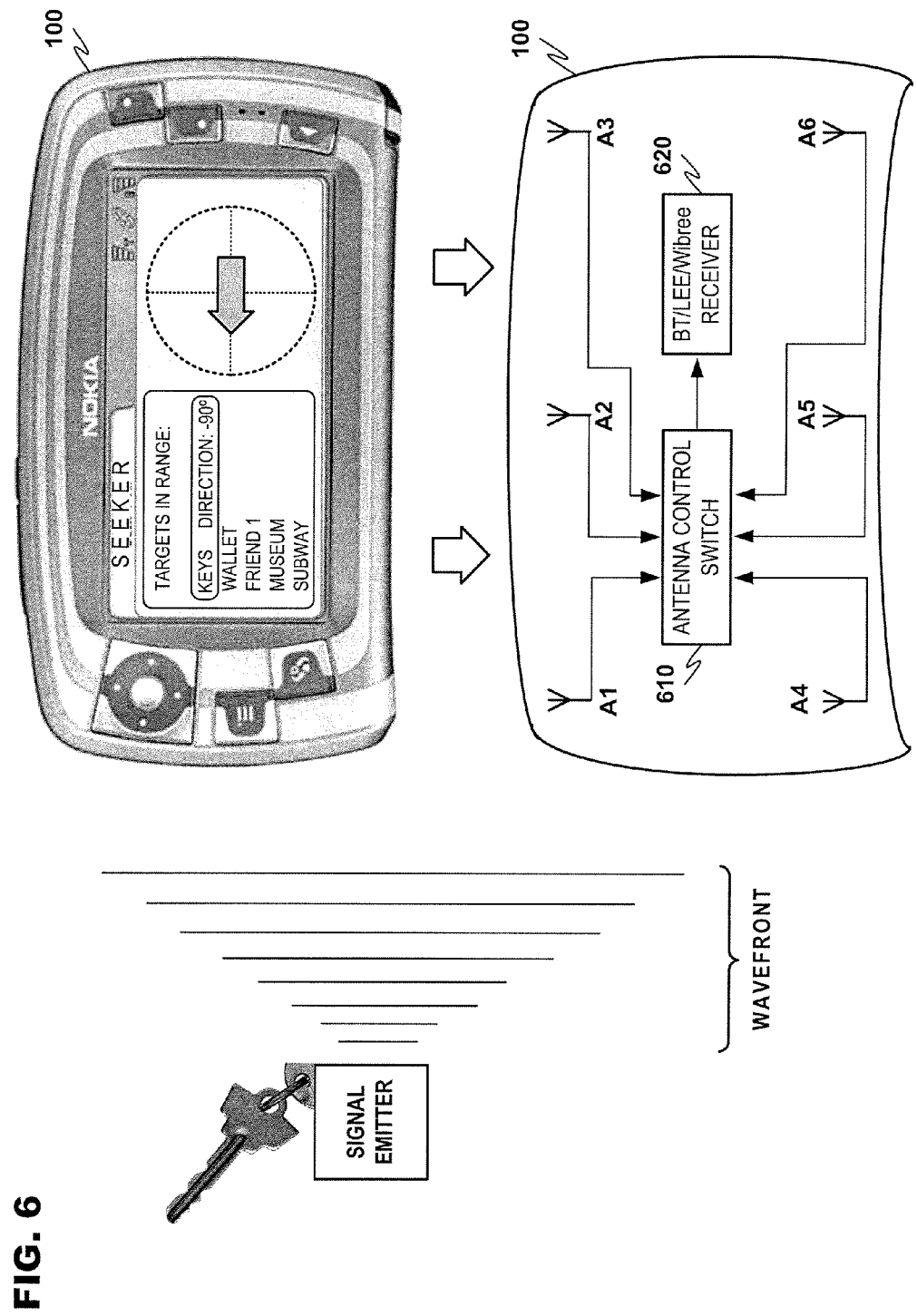
FIG. 6 discloses an exemplary structural description for direction-finding features usable for receiving a position-indicating transmission in accordance with at least one embodiment of the present invention.

FIG. 6 includes a structural diagram of WCD 100. Again, WCD 100 includes any and or all of the elements and features previously disclosed in FIGS. 2 and 3. In FIG. 6, additional elements and features are included that may be composed of stand-alone devices, or may be emulated by combinations of hardware and software present in WCD 100. Antennas A1-A6 may be coupled to antenna control switch 610. Control switch 610 multiplexes the antennas so that one receiver 620 may monitor incoming transmissions from all of the antennas. Signals received on antennas A1-A6 determine the relative direction to a target from WCD 100. The direction of arrival of the incident signal (e.g., the position-indicating transmission) is resolved based on the phase and possibly amplitude differences of the signals received by the respective antennas A1-A6. Control switch 610 sequentially feeds the signal from each antenna to the receiver 620, where the Direction of Arrival ("DoA") signal processing operates on the signal phase and possibly amplitude info ration to determine a relative direction to a target from WCD 100. This information is fed to receiver 620. Depending on the technology used in the switch, for example GaAs FETs vs. PIN diodes, the switch may operate at different speeds. In view of present technology, it appears that a 10 µs scan time for all antennas is conceivable. Fast switching time is beneficial because it allows DoA estimation from short transmissions and does not set high requirements for the stationarity of the radio channel.

In at least one embodiment of the present invention, receiver 620 may be a receiver for Bluetooth™, Bluetooth Low End Extension (BTLEE), Wibree™, etc. BTLEE and Wibree™ are based on the Bluetooth™ protocol, but have been refined to be more suitable for simpler wireless devices. These wireless communication media allow low end devices to communicate with a significantly lower power requirement. BTLEE or Wibree™ may be implemented in chip form to make Bluetooth™ implementation in low end devices more economical. The use of BTLEE or Wibree™ may be more appropriate for the location of personal items. A BTLEE or Wibree™ chipset may be incorporated into a keychain or into the lining of a wallet or garment to allow locating via wireless communication, as will be explained below. BT/LEE/Wibree™ receiver 620 receives signals multiplexed from Antennas A1-A6 and uses this information to determine relative direction using DoA signal processing as previously described. The receiver may also, in some cases, receive information contained within the position-indicating transmission. In these cases the determination of direction and the reception of information carried within the signal may be delayed as the primary receiver 620 attempts to multitask both information reception and DoA determination. This situation may be cured by the further example disclosed in FIG. 7.

The example structural configuration of FIG. 7 separates the responsibility of determining DoA determination and BT/LEE/Wibree™ reception into two separate receiving modules. Antenna A1 is directly tied to BT/LEE/Wibree™ receiver 720 so that information may be received real-time from the position-indication transmission for immediate decoding. As will be discussed later, this information may include identification information announcing that the device is a possible target, identification of the target and other target related data. Dedicated DoA receiver 730 may then be free to concentrate on deriving the time and spacing relationship between the reception of the position-indicating transmission at the various antennas in the antenna array, which is used to determine the relative direction of the object from WCD 100. The information received by both devices may be synchronized, for example, by control and DoA timing information sent from BT/LEE/Wibree™ receiver 720 to DoA receiver 703. Further, both receiving devices may then forward information to central processor 300 which may combine, process, and format the information for display on WCD 100. Although FIG. 7 shows two receivers 720 and 730, alternative embodiments may include more than two receivers. In other examples of the present invention, receivers may also share some components, such as a VCO or synthesizer.

FIG. 7 also discloses two exemplary antenna configurations usable in at least one embodiment of the present invention. These examples of antenna configurations as shown at 700 and 710 may be implemented to improve signal reception and directional indication in the device. The more appropriate antenna configuration, or even the use of antennas as a signal receiving component, will depend on a variety of factors including the size of the device, the composition (e.g., materials, layout, complexity, etc.) of the device, the antenna radiation characteristics required for each antenna, signal receiver spacing, etc.

V. The Directional Signal

Figure 8:
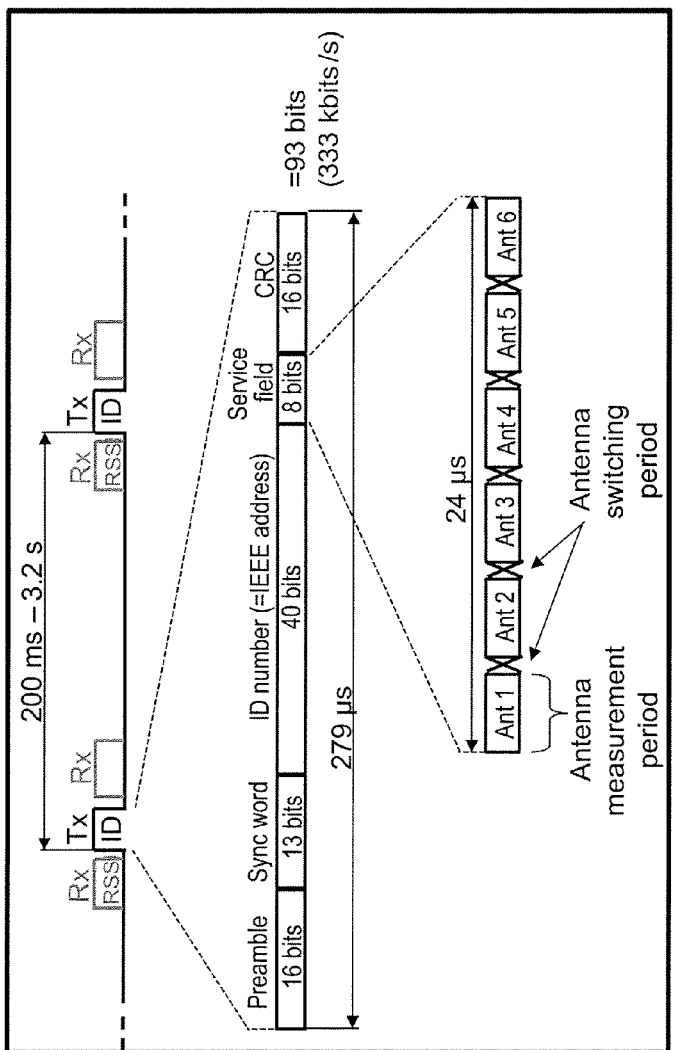
FIG. 8 discloses an exemplary position-indicating transmission and different transmission strategies in accordance with at least one embodiment of the present invention.

FIG. 8 discloses the makeup of an exemplary position-indicating transmission and different types of position indicating signals. Signal description 800 includes an example frame from a BTLEE transmission. While BTLEE has been used for the sake of example, any of the aforementioned wireless communication mediums may also be applicable, such as Wibree™, Bluetooth™, etc. Initially, the transmission must be identified as a position-indicating transmission. The 16 bit preamble may include a code (e.g., 1010101010101010) that is used to indicate the beginning of the packet and to synchronize the receiver. This indication allows WCD 100 to begin measurement so that when the 8 bit service field is in transmission, one or both of the preamble and the service field may be measured by antennas A1-A6 in WCD 100. The transmission 800 may also include identification information for the position-indicating transmission device, or other device target related information as will be described below.

In addition, different types of position-indicating transmission strategies as disclosed in FIG. 8. Remotely activated location transmission 802 may be employed by a target whose signal emitter 500 may be limited by low power concerns. These devices, such as battery-operated transmitters in a keychain, in a wallet, embedded in an ID badge, mounted in a vehicle such as an automobile, motorcycle, scooter, bicycle or in a piece of clothing, may be activated remotely by a user as needed. For example, the device may operate in a lower power or power conservation mode until a message is received instructing a device to activate the position-indicating transmission signal. This message may be received by any of the aforementioned wireless mediums such as via a Bluetooth™ message. Alternatively, signal emitter 500 may include a transponder, activated by a scanning signal from WCD 100. This scanning signal may be, for example, a UHF RFID signal. This signal may activate a transponder in a 5-10 meter range, and the transponder may respond with a signal that can be used to determine the object's relative position, or may in turn trigger another subsystem in signal emitter 500 to transmit the position-indicating transmission.

In 804, the relative direction towards devices that require a request to activate may be determined. These are typically powered devices that are in the possession of another user. For example, User 110 may want to locate a friend that user 110 believes to be in the immediate area. User 110 may send a message to the friend's WCD requesting an activation of a position-indicating transmission. This message may occur via any of the long-range mediums (for example, via SMS) or any of the short-range mediums previously discussed. Depending on whether the friend is familiar with user 110, or for other security-related reasons, the friend may accept or deny the request to activate the position-indicating feature in their WCD. If the friend declines, a message may be returned to WCD 100 that indicates the friend has refused the locating request. Alternatively, the friend may accept the request, activate their location beacon and WCD 100 may receive the position-indicating transmission. This feature may be utilized for commercial features as well. WCD 100 may indicate that there is a taxi cab in the immediate area. User 110 may send a message to the taxi requesting to hire the cab and position indication. If the taxi is already hired or on a break, the driver may refuse the request, or ignore it. On the other hand, if the driver is looking for a fare he may accept the request, the relative position of the taxi being displayed in WCD 100 with other relevant information such as fare information.

A third type of target may include always active position-indicating beacons 806. The signal emitters in these target beacons may include expanded range externally powered devices (e.g., Bluetooth™ access points). WCD 100 may receive signals from these position markers so that user 110 may locate desired services. For example, police cars, ambulances, hospital emergency rooms, etc. may utilize always active beacons 806 so that their signal may be received by people seeking help (e.g., in an emergency). Otherwise, always-active beacons 806 may also be utilized to indicate the direction towards short-range wireless access points for connecting to a WLAN (e.g., Internet) and other places of interest, such as historical landmarks, commuter transportation (e.g., buses and trains), restaurants, stores and entertainment venues.

VI. The Calibration Process

As set forth above, DoA estimation may be used to determine the direction towards an object by interpreting the strength of a signal received on various signal receivers that together form a signal receiver array integrated within, or coupled to, a device (e.g., a handheld device such as a handheld tracking and/or communication device, a wireless base station, etc.). The relationship between the signal receiver response on each signal receiver that is induced by a received target signal and the relative direction towards the object emitting the target signal may be characterized in terms of an effective aperture distribution function (EADF). In accordance with at least one embodiment of the present invention, the EADF may include a matrix of signal receiver response relationship values established so that applications utilizing DoA estimation may interpret the received signal information in order to derive a direction towards the origin of the received signal.

In order to render an accurate DoA estimation, hardware and/or software in an exemplary device including direction-finding functionality may be calibrated in view of an integrated or externally signal receiver array in order to formulate a more accurate induced response relationship as dictated by the EADF. As previously described, a typical method for calibrating a signal receiver array made up of multiple antennas may include a device-by-device signal reception and response test in a controlled environment. Such a process may be prohibitive in a manufacturing situation in view of required environmental control and test time requirements. Further, calibration performed in such an environment may not be suitable long term. For example, handheld devices may experience a variety of different environments in transit to a user. It is foreseeable that temperature extremes, impact to the device, electromagnetic field exposure, etc. could affect the performance of one or more direction-finder system components. Over time, devices may also be used in an environment that includes similar stimuli that could affect device accuracy without renewed calibration.

Figure 9A:
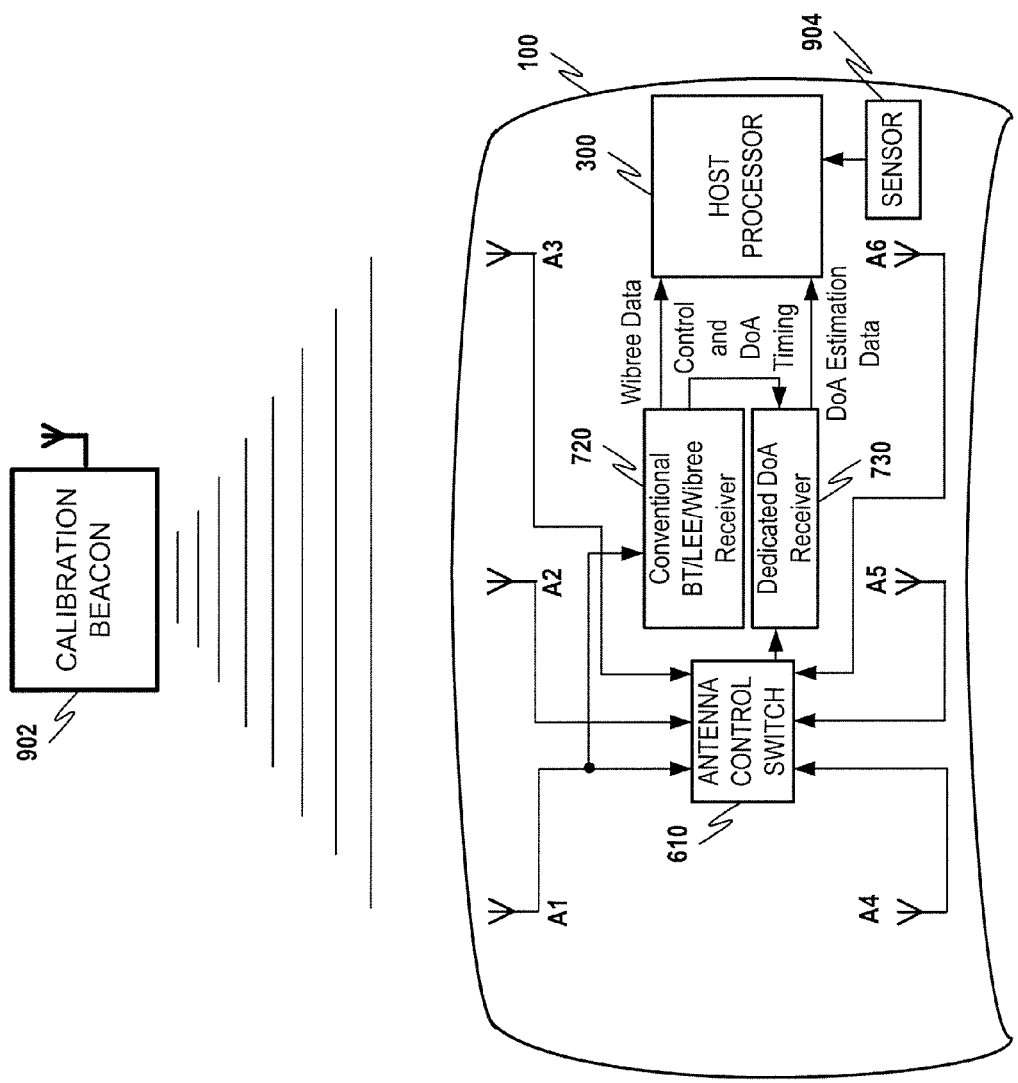
FIG. 9A discloses an exemplary external tag and device orientation at the initiation of calibration in accordance with at least one embodiment of the present invention.

A configuration in accordance with at least one embodiment of the present invention is disclosed in FIG. 9A. An example of a handheld device (e.g., WCD 100) is shown receiving a wireless beacon signal from calibration beacon 902, also generally referred to in the following disclosure as a "tag." Calibration beacon 902 may take different forms in various embodiments of the invention. For example, calibration beacon 902 may be a tool used by a supply chain entity (e.g., store, service center or other value-added provider) in order to calibrate WCD 100 before delivery to a customer. In another scenario, calibration beacon 902 may be a low-power device supplied to user 110 along with WCD 100 to be utilized specifically for calibration. Calibration beacon 902 may also be a device to be used along with WCD 100 that is sold primarily as a calibration tool or as an accessory such as a key chain. Even a building or other structure with a fixed beacon can be used for calibration. The only requirements for calibration beacon 902 are that it be at least temporarily stationary and able to send a message identifiable by WCD 100 as a target signal usable for calibration.

As previously described with respect to FIG. 7, WCD 100 may include a direction-finding system including various hardware and/or software components that may be utilized in computing a DoA estimation. These supporting components may include a signal receiver array, such as an antenna array comprising antennas A1-A6, and various chip components and/or software-based modules that interpret the received signal data in order to determine the relative direction towards the source of the target signal (e.g., 610, 720 and 730). However, WCD 100 may further include a sensor 904. Sensor 904 may be an electronic or electromechanical component, and may sense an orientation or change in orientation for WCD 100. For instance, sensor 904 may sense device orientation based on fixed coordinate system (e.g., via a global positioning system based on satellite signals, signal information triangulated from cell towers, signal information from short-range wireless access points, etc.) Similarly, a compass incorporated within WCD 100 may provide orientation information based on a fixed reference (e.g., an angular degree based on a sensed magnetic North direction). Otherwise, sensor 904 may be a sensing component configured to recognize a change in position via acceleration experienced when WCD 100 is moved or rotated. More specifically, a starting position may be recorded in WCD 100, and then when the device orientation is changed, for example by a user spinning the device, the measured movement in a certain direction is utilized to calculate the new device orientation.

Figure 9B:
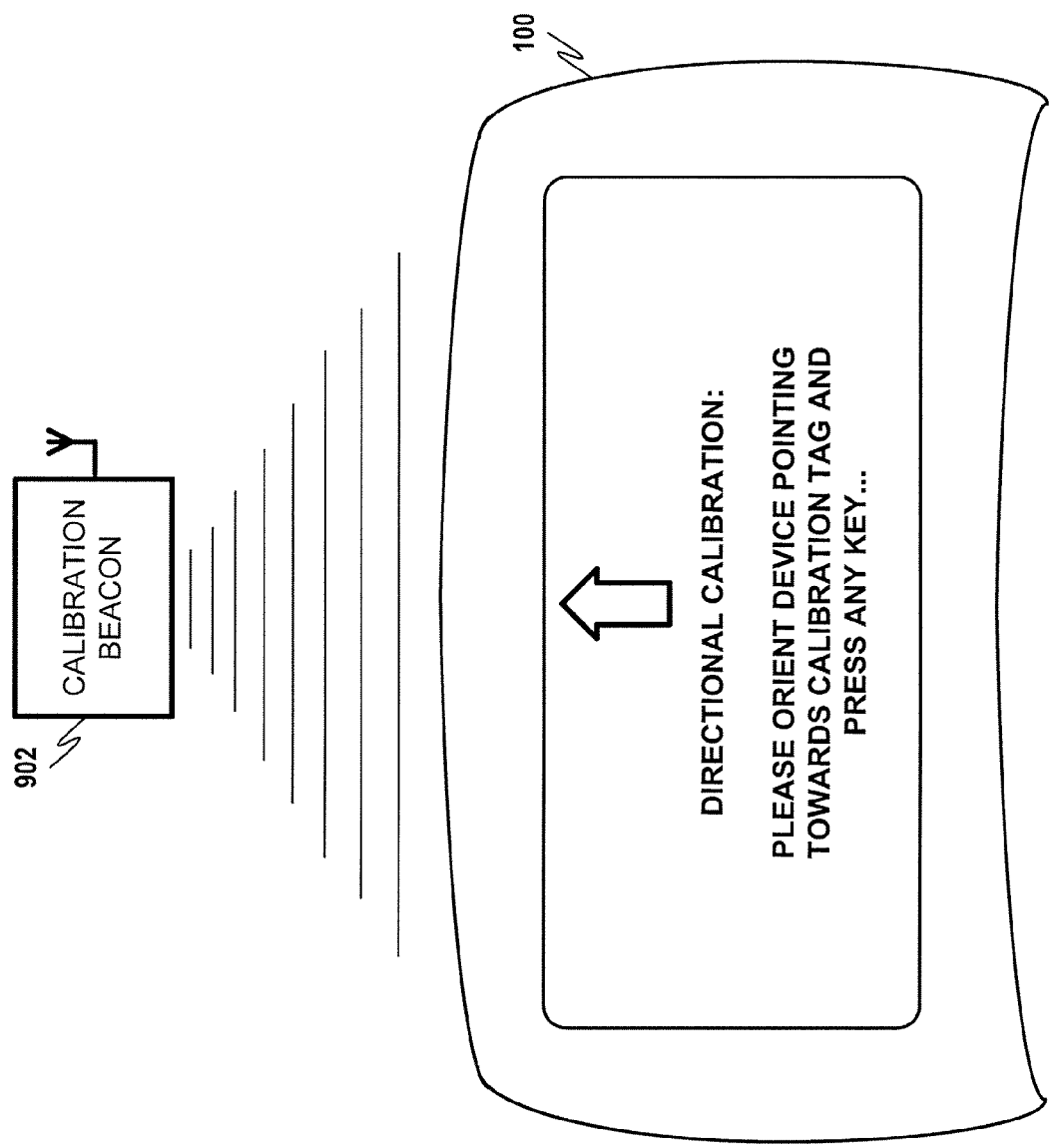
FIG. 9B discloses an exemplary user interface prompt for initiating calibration in accordance with at least one embodiment of the present invention.

Since at least one embodiment of the present invention involves interaction with user 110 in order to execute the calibration process, an exemplary user interface screen is disclosed in FIG. 9B. Initially, user 110 may initiate the calibration process by selecting an option to start a calibration process from a menu in WCD 100. The activation of the calibration may, in accordance with at least one embodiment of the present invention, activate procedures stored in a direction finding system related to calibration. Alternatively, the activation of calibration may initiate software programs stored in the general memory of WCD 100. The particular configuration that is employed to execute calibration may depend, for example, on the complexity, memory, architecture, user interface, etc. of the device.

The device may then ask, as shown for example in FIG. 9B, to position or orient the device so that it is pointing towards calibration beacon 902. This orientation may be represented by indicia shown on a display screen in WCD 100, for example user 110 may be required to align an arrow on the display so that it is pointing towards calibration beacon 902. The device may use this initial position as a reference point of device location when performing calibration. More specifically, since a device requiring calibration may not be able to accurately locate target devices based on a received signal, calibration may require user 110 to place the device (e.g., WCD 100) in a predetermined position with respect to calibration beacon 902 to establish a point of reference. WCD 100 may then proceed with the calibration process upon sensing a signal from calibration beacon 902, or alternatively, as shown in FIG. 9B, user 110 may be prompted to press a key in order to move to the next step.

Figure 9C:
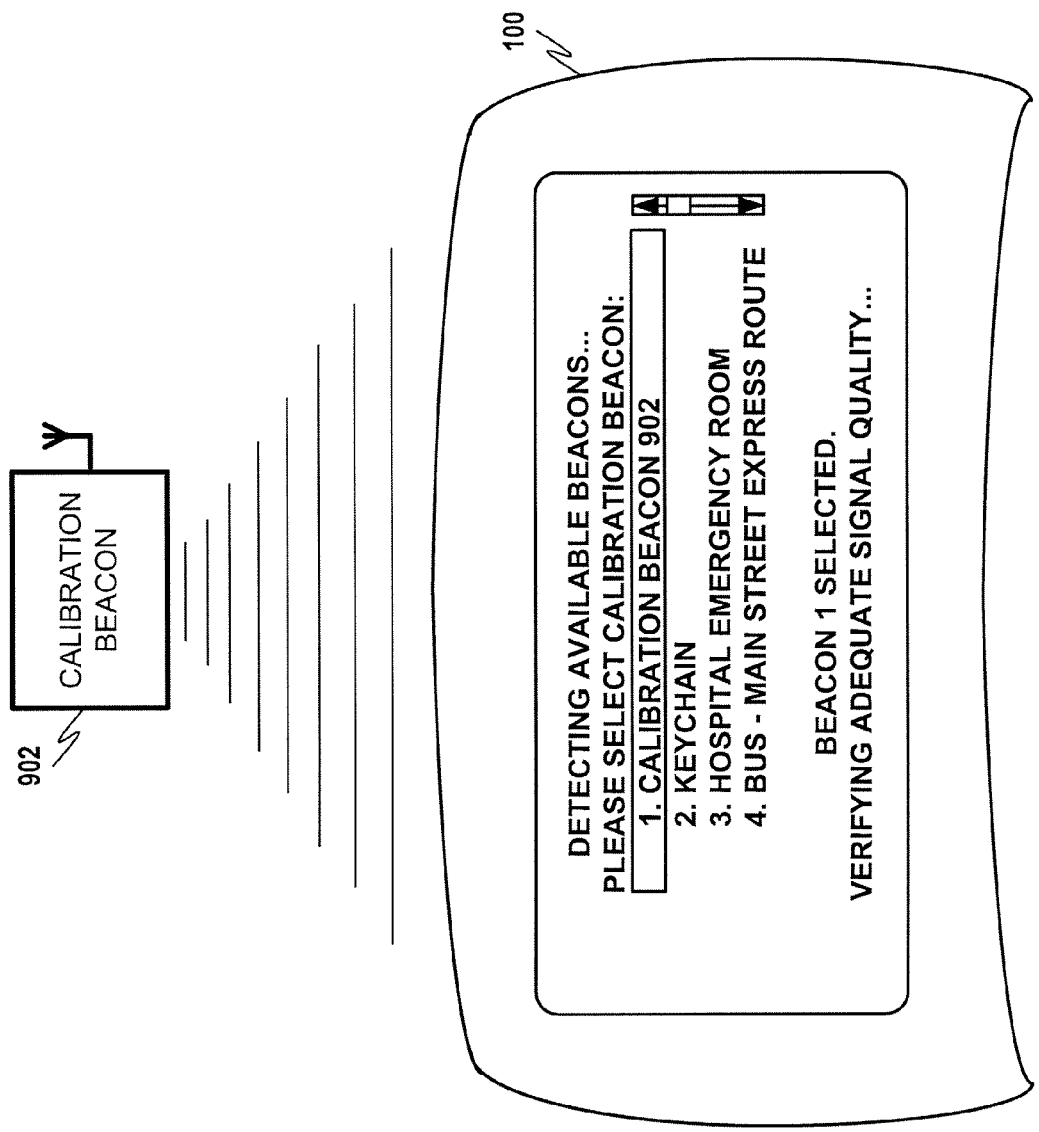
FIG. 9C discloses an exemplary user interface prompt for selecting a calibration beacon in accordance with at least one embodiment of the present invention FIG. 10A discloses an exemplary user interface prompt for instructing a user to proceed with calibration by moving a wireless communication device in accordance with at least one embodiment of the present invention.

WCD 100 may then proceed to scan for available beacons. Any wireless signal that may be identified as a potential calibration device may be listed for user 110 on a display in WCD 110. FIG. 9C discloses an example in accordance with at least one embodiment of the present invention. In this example, multiple potential target signals have been detected, and WCD 100 prompts user 110 to select the correct beacon. As one of the beacons is identified as "Calibration beacon 902," user 110 may select "1" via a user interface on WCD 100 to select the calibration beacon signal. Alternatively, a tag used for calibration may be specifically identified as calibration beacon 902 as part of the signal. For example, calibration beacon 902 may identify itself as a device to be used for calibration in packets transmitted in the beacon signal. WCD 100 may be configured to automatically identify and select calibration beacon 902 by reading information contained in these packets.

Once a beacon signal has been detected and selected, the quality of the signal may be verified. In at least one embodiment of the present invention, this evaluation may determine the signal-to-noise ratio (SNR) for the signal received from the wireless tag being utilized for orientation. For example, if the SNR is below an adequate level for performing calibration, WCD 100 may prompt user 110 for corrective action. For example, where calibration beacon 902 is being used in calibration, user 110 may be prompted to replace a battery in calibration beacon 902 or to move closer to the wireless tag. Otherwise, WCD 100 may simply inform user 110 that the signal selected for use in the calibration process is not strong enough to reliably calibrate the direction-finding system in WCD 100. While SNR has been utilized above as a quality measure, the present invention is not specifically limited to this configuration, and may utilize other signal characteristic measures in order to determine a signal quality level.

Upon detection of a signal usable in the calibration process, and verification that the detected signal is of adequate quality, WCD 100 may then prompt user 110 to initiate device movement. An example of a user interface movement prompt and device movement in accordance with at least one embodiment of the present invention is disclosed in FIG. 10A. The display of WCD 100 indicated that the initial reference position has been established and that calibration beacon 902 has been detected and verified. Further, the display prompts that the device should be rotated in a full circle, after which user 110 should wait for confirmation of calibration. As further shown in the example of FIG. 10A, WCD 100 is rotated around itself (e.g., in a counter clockwise direction) in response to the prompt. In at least one use scenario in accordance with at least one embodiment of the present invention, user 110 may place the device to be calibrated on a flat surface and rotate the device around itself while calibration beacon 902 remains stationary. The prompts given to user 110 during calibration is not only limited to what is disclosed, and may specify rotation method, speed, direction and/or a request to repeat the process as will be explained with respect to FIG. 10B-11.

Figure 10A:
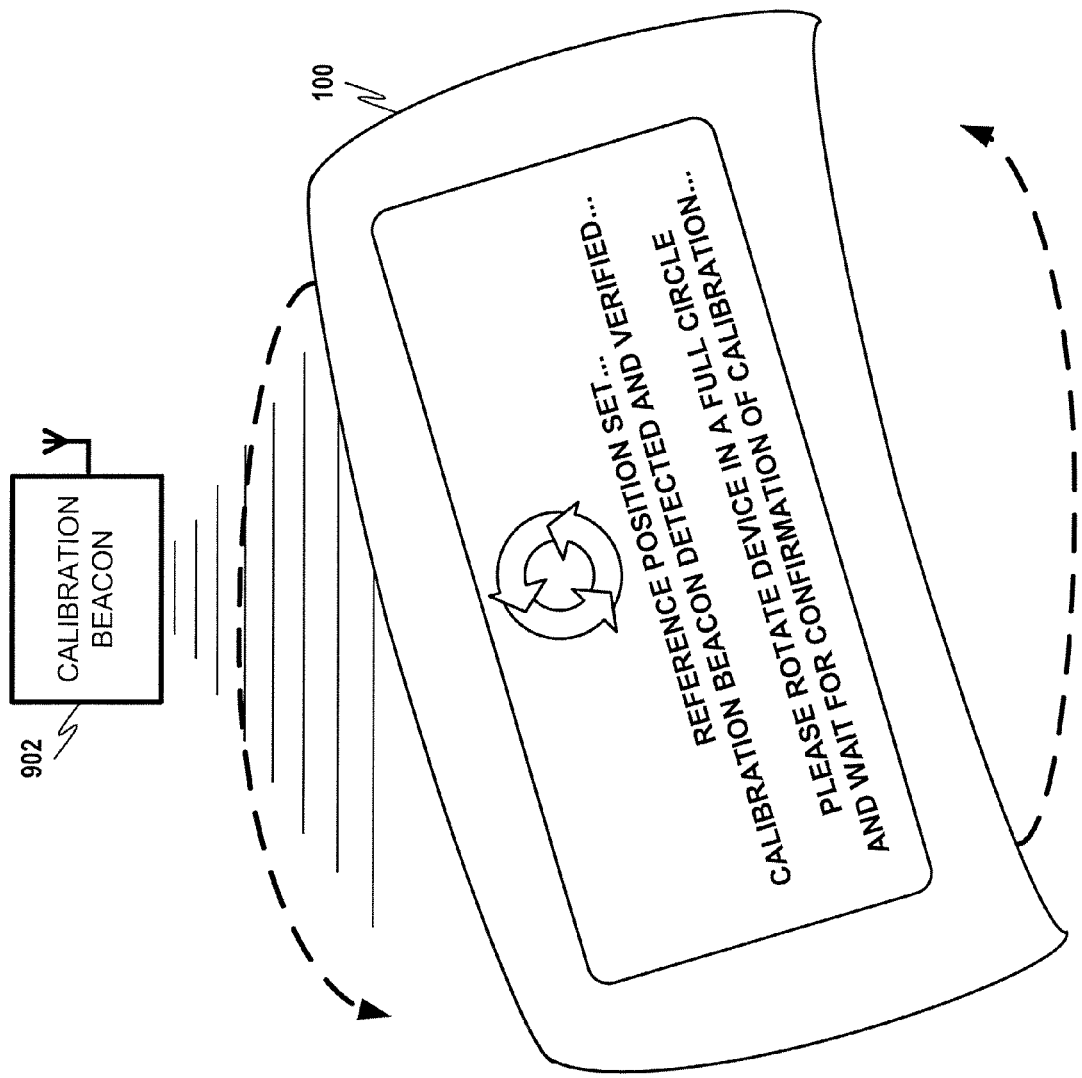
FIG. 10B discloses an example of moving a wireless communication device with respect to an external calibration tag as part of a calibration process in accordance with at least one embodiment of the present invention.
Figure 10B:
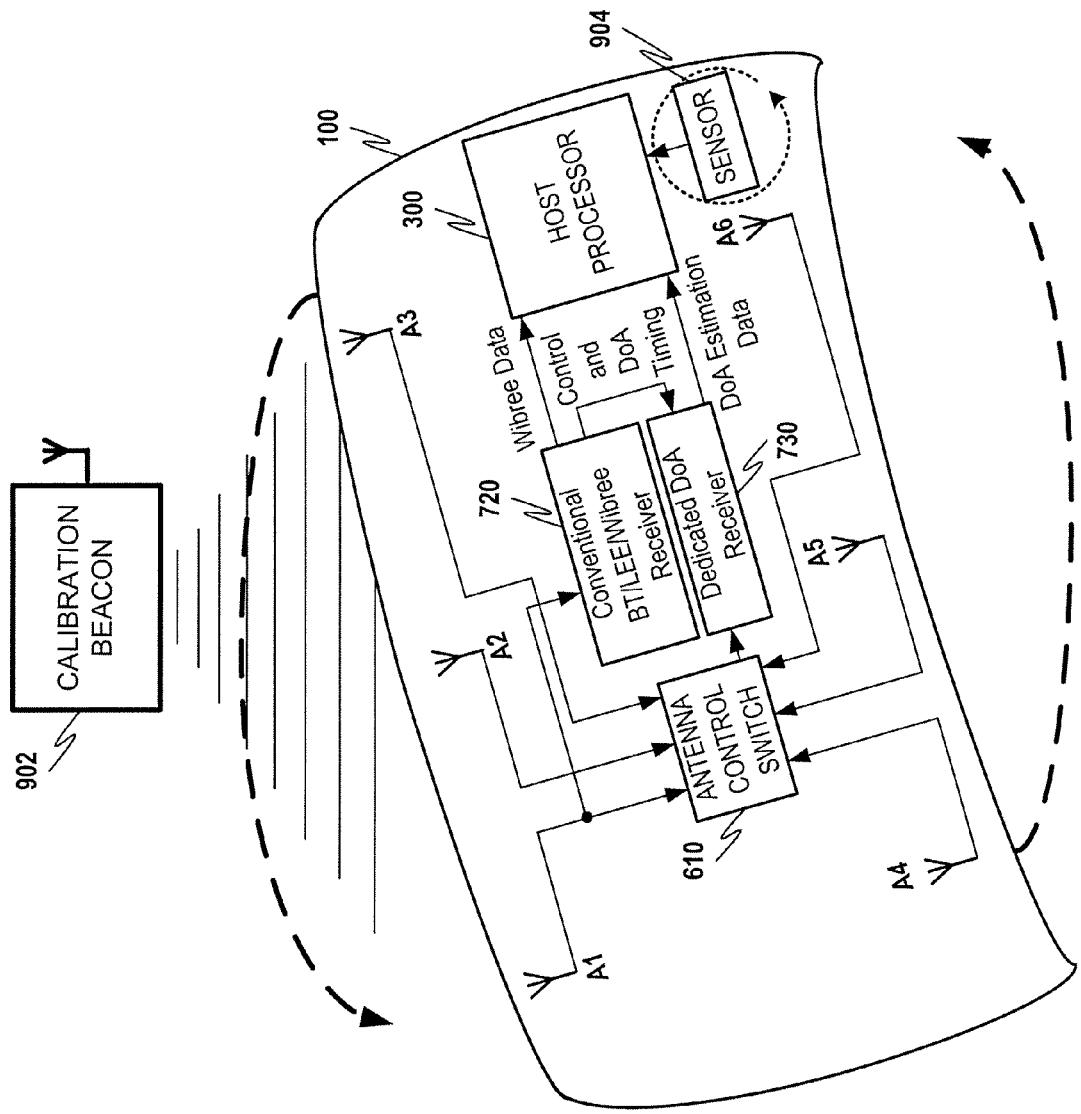

FIG. 10B discloses an example of the activity occurring inside WCD 100 when the actions depicted in FIG. 10A are executed. When WCD 100 is moved, for example in a circular motion as depicted, the signal receiver response for each signal receiver (e.g., an antenna array as disclosed in this example) will change due to the change in orientation for each signal receiver with respect to the fixed origin direction of arrival of the signal. Further sensor 904 will sense the movement of WCD 100. Information provided by sensor 904 may be used to determine the orientation of the device at any given time based on a fixed coordinate system or on a detected directional acceleration as discussed above.

As the device is moved in accordance with the calibration prompt, WCD 100 may periodically record the antenna response for each antenna and corresponding orientation and/or movement information as provided by sensor 904. The data created by this process may yield a series of points wherein an antenna response characteristic for each antenna in the antenna array may be mapped to a device orientation as sensed by sensor 904 or derived from the sensed information. This data may be interpolated, for example using Wavefield modeling, by WCD 100 in order to create an EADF matrix. As set forth above, The EADF matrix may be utilized by various applications in WCD 100 in order to derive a DoA estimation based on the signal characteristics detected by each antenna in the antenna array. This may conclude the calibration process, which may be indicated to user 110 on a display in WCD 100. In an alternative configuration of the present invention, a reference EADF matrix may already be loaded onto WCD 100, and the calibration process may be utilized as a technique for correcting the reference response values recorded for the antenna array when, for example, the reference EADF matrix values are determined to be out-of-calibration.

Figure 11:
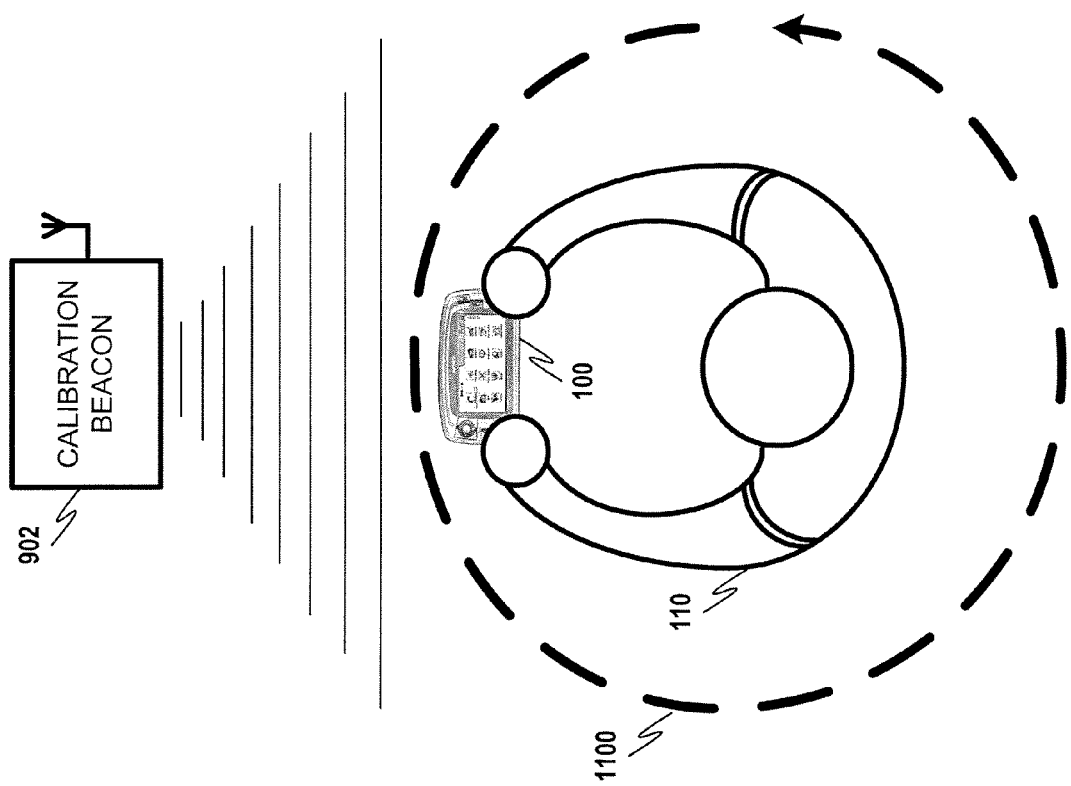
FIG. 11 discloses an example of a user moving a device held in the user's hand with respect to an external tag as part of a calibration process in accordance with at least one embodiment of the present invention.

The calibration process may also employ other types of movement to generate signal receiver response and device orientation data in accordance with various embodiments of the present invention. FIG. 11 discloses an exemplary movement pattern wherein user 110 holds WCD 100 and turns in a circle in order to create data utilized in generating a new EADF matrix or correcting a reference EADF matrix. This process may be beneficial, for example, when user 110 is outdoors and does not have a surface on which to place WCD 100, or in a noisy environment where a greater positional change may be necessary to create signal receiver response data that is distinguishable from ambient signal interference. As shown at 1100, user 110 may hold WCD at arms length and may spin in a circle with respect to a stationary calibration beacon 902. This process may further take into account potential interference may be caused by user 110. For example, when user 110 spins 180 degrees, user 110 will be facing away from calibration beacon 902. This position would interpose the torso of user 110 between calibration beacon 902 and WCD 100, potentially distorting at least part of the signal. In at least one embodiment of the present invention, signal receiver response and orientation information covering an entire 360° radius must be obtained in order to arrive at an accurate direction-finding calibration. Therefore, all of the information recorded as part of the calibration process would be need to be used, regardless of any distortion that may be caused by the body of user 110. In order to account for this problematic scenario, a provision may be incorporated into the calibration process when sensor 904 determines that user 110 has moved WCD 100 to a position where the body of user 110 is interposed between WCD 100 and calibration tag 902. For example, the signal receiver response characteristics stored at this point may be adjusted to account for the received signal being altered by user 110.

Figure 12:
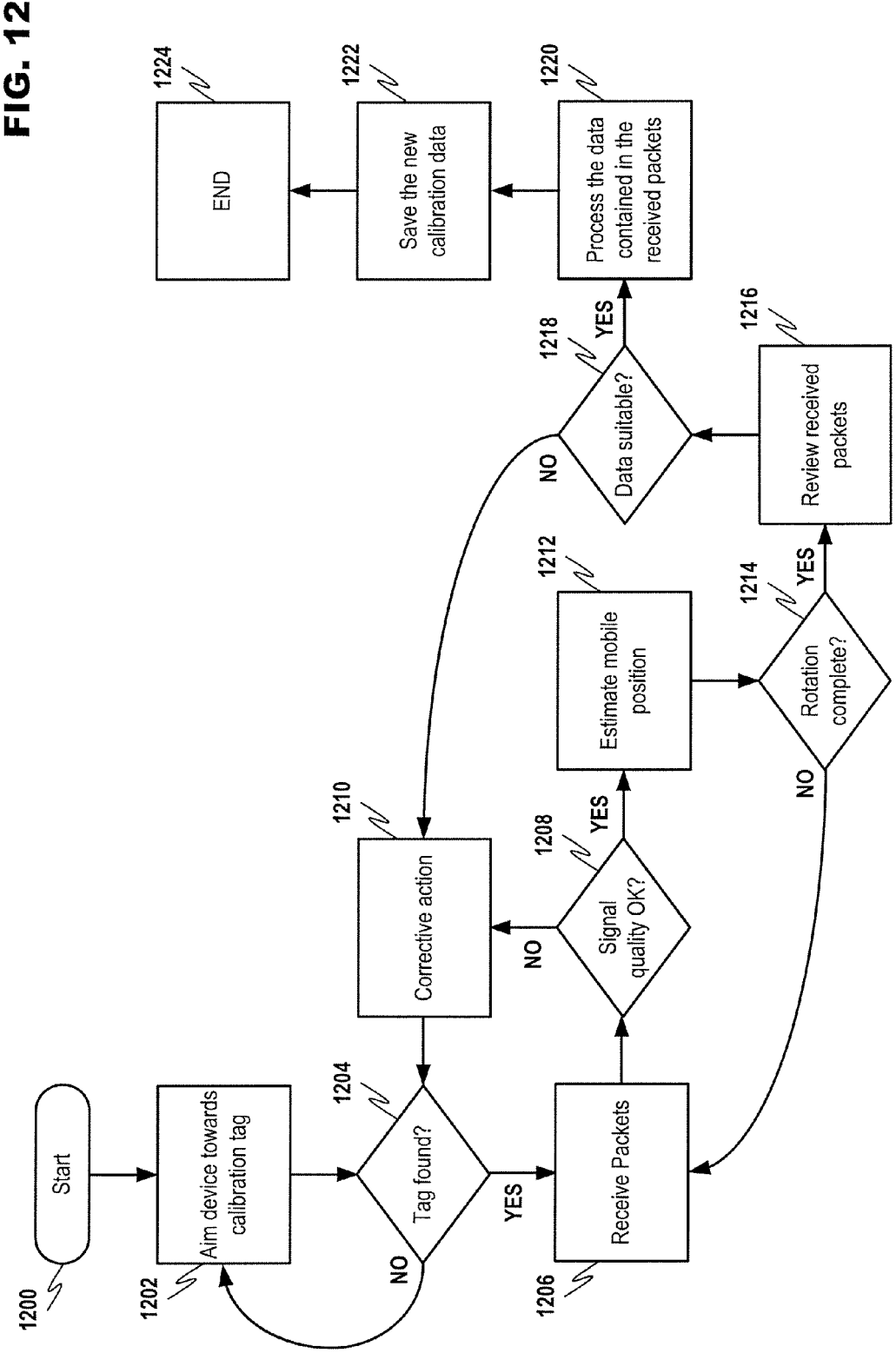
FIG. 12 discloses a flowchart for an exemplary calibration process in accordance with at least one embodiment of the present invention.

A flowchart describing an exemplary process in accordance with at least one embodiment of the present invention is disclosed in FIG. 12. The process starts in step 1200, for example, when user 110 determines that WCD 100 requires calibration. In step 1202 the device may be aimed at a calibration tag. As previously set forth, a calibration tag may be a specialized tag like calibration beacon 904, or may be any stationary signal identifiable by WCD 100. Further, user 110 placing a device to be calibrated in a predetermined position with respect to calibration beacon 904 may establish a reference point by which a calibration process may interpret signal receiver response information and the sensor orientation data. All available signals may then be identified and displayed by WCD 100 for selection by user 110, or alternatively, the device may automatically recognize a calibration signal by data contained within the signal (e.g., header or payload information of received packets).

The process may loop between steps 1202 and 1204 until a tag is located. Once a calibration tag is located and manually selected or automatically identified, packets originating from the calibration tag may be received by WCD 100 in step 1206. In at least one embodiment of the present invention, the signal quality of the received packets may be verified in step 1208. For example, the SNR may be measured with respect to an allowable threshold value. If the signal strength is not high enough with respect to the noise, corrective action may be initiated in step 1210. Corrective action may include instructing user 110 about possible remedies, for example, moving WCD 100 closer to the calibration tag, checking a power source (e.g., a battery) in the calibration tag, using a different signal source, etc. The process may also return to step 1204 where the calibration tag is identified. If the signal quality is acceptable for calibration, then the process may continue in step 1212.

In step 1212 the signal received by the antenna array incorporated within or coupled to WCD 100 is recorded while simultaneously recording information from sensor 904. This process may store periodic antenna response information and sensor information until the device has been rotated a full 360 degrees (step 1214). The stored information may be verified in step 1216 to determine if a reliable EADF matrix may be generated. If the stored antenna and orientation data is determined to be not suitable for generating the calibration matrix in step 1218, for example due to missing or erroneous data, then in step 1210 the process may again initiate corrective action. For example, WCD 100 may prompt the user to move WCD 100 closer to the calibration tag and reinitiate the process at 1204. If the information is deemed suitable in step 1218, then data processing may begin in step 1220.

In step 1220 the antenna response data and sensor data may be processed in WCD 100. For example, the sensor data may be interpolated in order to determine a device orientation that corresponds to the periodically sampled antenna response for each antenna. Once processed, the antenna response data and device orientation data may be combined in order to generate an EADF matrix. The EADF matrix may be used by various applications in WCD 100, for example a direction-finding system application, in order to estimate the DoA of a target signal. After the calibration information is generated, it may be stored in WCD 100 in step 1222, and in step 1224 the calibration process may terminate. The exemplary calibration process may then be reinitiated whenever recalibration is deemed necessary.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   activating a calibration operation in a device;
   identifying calibration signal sources based on signals received in the device;
   displaying an identification on the device for each of the calibration signal sources, the identification being derived from the received signals;
   if more than one calibration signal source was identified, selecting a calibration signal source from the calibration signal sources displayed on the device;
   displaying instructions on the device for orienting the device relative to the calibration signal source;
   receiving a signal from the calibration signal source into the device via a signal receiver array coupled to a direction-finding system in the device;
   measuring a signal response induced by the signal in each signal receiver of the signal receiver array;
   determining, based on the signal response, if the received wireless signal quality is sufficient for use in calibration;
   if the quality of the received signal is sufficient for use in calibration, determining orientation information for the device when the signal response is measured;
   storing the signal response and the orientation information at various instances while moving the device in accordance with instructions displayed on the device; and
   calibrating the direction-finding system in the device based on the stored signal response and the orientation information.

2. The method of claim 1, wherein the signal comprises packets, the device identifying the calibration signal sources based on packet address information.

3. The method of claim 1, wherein the signal quality is determined based on at least one of signal to noise ratio or signal power level.

4. The method of claim 1, wherein the orientation information includes at least a rotational angle provided by a sensor in the device, the sensor being at least one of an acceleration sensor configured to measure rotational acceleration or a compass.

5. The method of claim 1, wherein moving the device comprises at least one of rotating the wireless communication device around a center point in the device or a user holding the wireless communication device while rotating their body in a circle.

6. The method of claim 5, wherein the device takes into account interference caused by the user when holding the device.

7. The method of claim 1, wherein the stored signal response and the orientation information are used to create a matrix of calibration values in the device.

8. A computer program product comprising computer executable program code recorded on a computer readable non-transitory storage medium, the computer executable program code comprising:

code configured to activate a calibration operation in a device;
   code configured to cause the device to identify calibration signal sources based on signals received in the device;
   code configured to cause the device to display an identification on the device for each of the calibration signal sources, the identification being derived from the received signals;
   code configured to, if more than one calibration signal source was identified, cause the device to receive the selection of a calibration signal source from the calibration signal sources displayed on the device;
   code configured to cause the device to display instructions for orienting the device relative to the calibration signal source;
   code configured to cause the device to receive a signal from the calibration signal source into the device via a signal receiver array coupled to a direction-finding system in the device;
   code configured to cause the device to measure a signal response induced by the signal in each signal receiver of the signal receiver array;
   code configured to cause the device to determine, based on the signal response, if the received wireless signal quality is sufficient for use in calibration;
   code configured to, if the quality of the received signal is sufficient for use in calibration, cause the device to determine orientation information for the device when the signal response is measured;
   code configured to cause the device to store the signal response and the orientation information at various instances while moving the device in accordance with instructions displayed on the device; and
   code configured to cause the device to calibrate the direction-finding system in the device based on the stored signal response and the orientation information.

9. The computer program product of claim 8, wherein the signal comprises packets, the code being further configured to cause the device to identify the calibration signal sources based on packet address information.

10. The computer program product of claim 8, wherein the code is further configured to cause the device to determine the signal quality based on at least one of signal to noise ratio or signal power level.

11. The computer program product of claim 8, wherein the orientation information includes at least a rotational angle provided by a sensor in the device, the sensor being at least one of an acceleration sensor configured to measure rotational acceleration or a compass.

12. The computer program product of claim 8, wherein moving the device comprises at least one of rotating the wireless communication device around a center point in the device or a user holding the wireless communication device while rotating their body in a circle.

13. The computer program product of claim 12, wherein the code further causes the device to take into account interference caused by the user when holding the device.

14. The computer program product of claim 8, wherein the code is further configured to cause the apparatus to create a matrix of calibration values in the device using the stored signal response and the orientation information.

15. A module, comprising:
    at least one communication component coupled to a signal receiver array, and
    at least one direction-finding component coupled to the communication component, the at least one direction-finding component being configured to:

identify calibration signal sources based on signals received in the device;
display an identification on the device for each of the calibration signal sources, the identification being derived from the received signals;
if more than one calibration signal source was identified, receive the selection of a calibration signal source from the calibration signal sources displayed on the device;
receive a signal from a signal source into the signal receiver array;
measure a signal response induced by the signal in each signal receiver of the signal receiver array;
determine, based on the signal response, if the received wireless signal quality is sufficient for use in calibration;
if the quality of the received signal is sufficient for use in calibration, determine orientation information for the device when the signal response is measured;
store the signal response and the orientation information at various instances while moving the device in accordance with instructions displayed on the device; and
calibrate the direction-finding system in the device based on the stored signal response and the orientation information.

16. The module of claim 15, wherein the signal receiver array is an antenna array.

17. The module of claim 15, wherein the orientation information is provided by a sensor coupled to the module and configured to provide at least one of orientation or acceleration information.

18. A device, comprising:
at least one processor; and
at least one memory including executable instructions, the at least one memory and the executable instructions being configured to, in cooperation with the at least one processor, cause the device to perform at least the following:
receive an activation of a calibration operation in the device;
identify calibration signal sources based on signals received in the device;
display an identification on the device for each of the calibration signal sources, the identification being derived from the received signals;
if more than one calibration signal source was identified, receive the selection of a calibration signal source from the calibration signal sources displayed on the device;
display instructions to a device user for orienting the device relative to the calibration signal source;
receive a signal from the calibration signal source into the device via a signal receiver array;
measure a signal response induced by the signal in each signal receiver of the signal receiver array;
determine, based on the signal response, if the received wireless signal quality is sufficient for use in calibration;
if the quality of the received signal is sufficient for use in calibration, determine orientation information for the device when the signal response is measured;
store the signal response and the orientation information at various instances while moving the device in accordance with instructions displayed on the device; and
calibrate the direction-finding system in the device based on the stored signal response and the orientation information.

19. The device of claim 18, wherein the signal receiver array is an antenna array.

20. The device of claim 18, wherein the orientation information is provided by a sensor integrated within the device and configured to provide at least one of orientation or acceleration information.

21. A system, comprising:
a device including at least a direction-finding system, a signal receiver array and a sensor; and
one or more signal sources;
the device receiving an activation of a calibration operation in the device;
the device identifying calibration signal sources based on signals received in the device and displaying an identification on the device for each of the calibration signal sources, the identification being derived from the received signals;
if more than one calibration signal source was identified, the device further receiving the selection of a calibration signal source from the calibration signal sources displayed on the device;
the device displaying instructions for orienting the device relative to the calibration signal source;
the device receiving a signal from the calibration signal source into the device via a signal receiver array, measuring a signal response induced by the signal in each signal receiver of the signal receiver array, and determining, based on the signal response, if the received wireless signal quality is sufficient for use in calibration;
if the quality of the received signal is sufficient for use in calibration, the device further determining orientation information for the device when the signal response is measured and storing the signal response and the orientation information at various instances while moving the device in accordance with instructions displayed on the device; and
the device calibrating the direction-finding system in the device based on the stored signal response and the orientation information.

* * * * *